Patented July 5, 1932

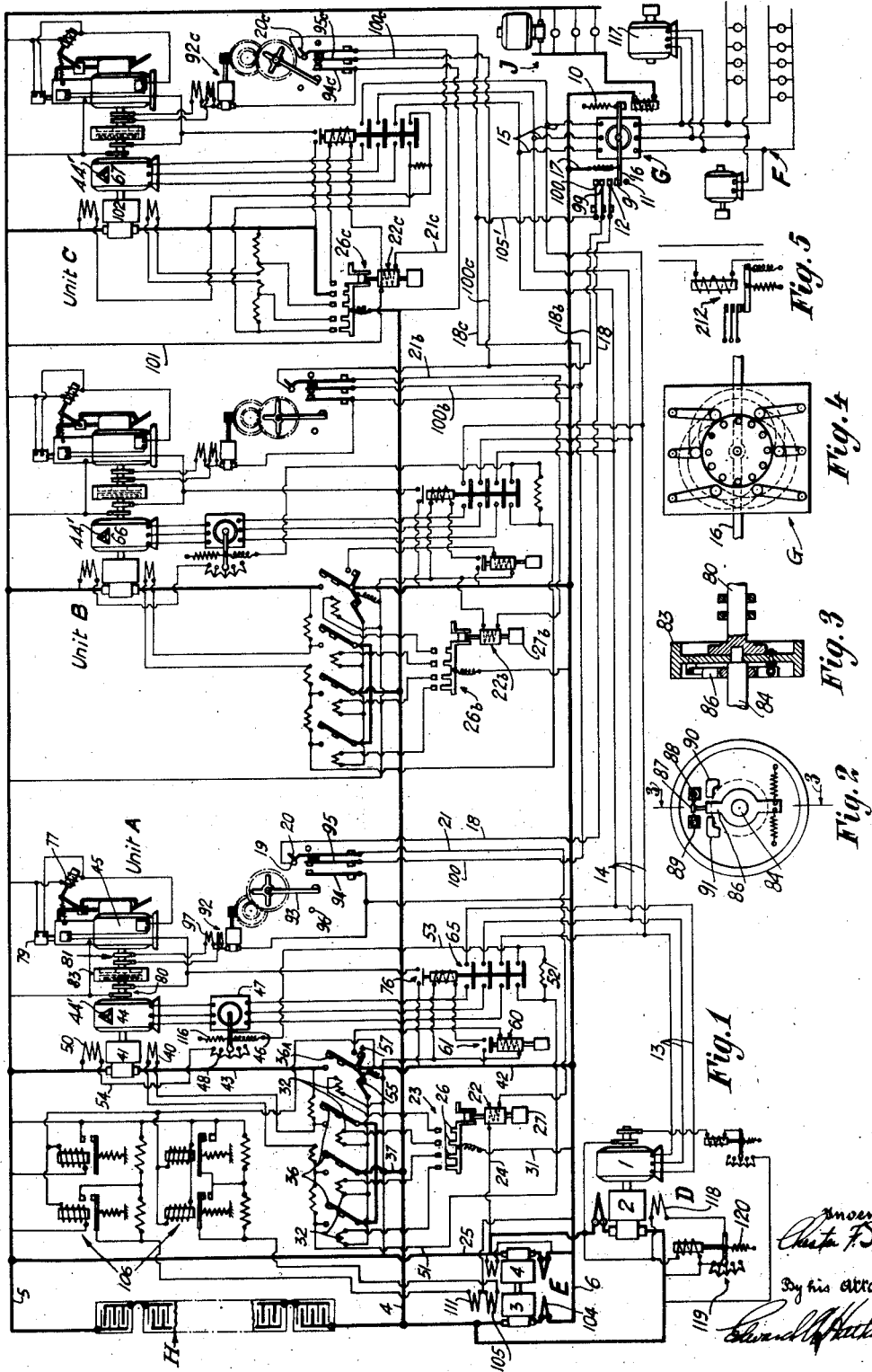

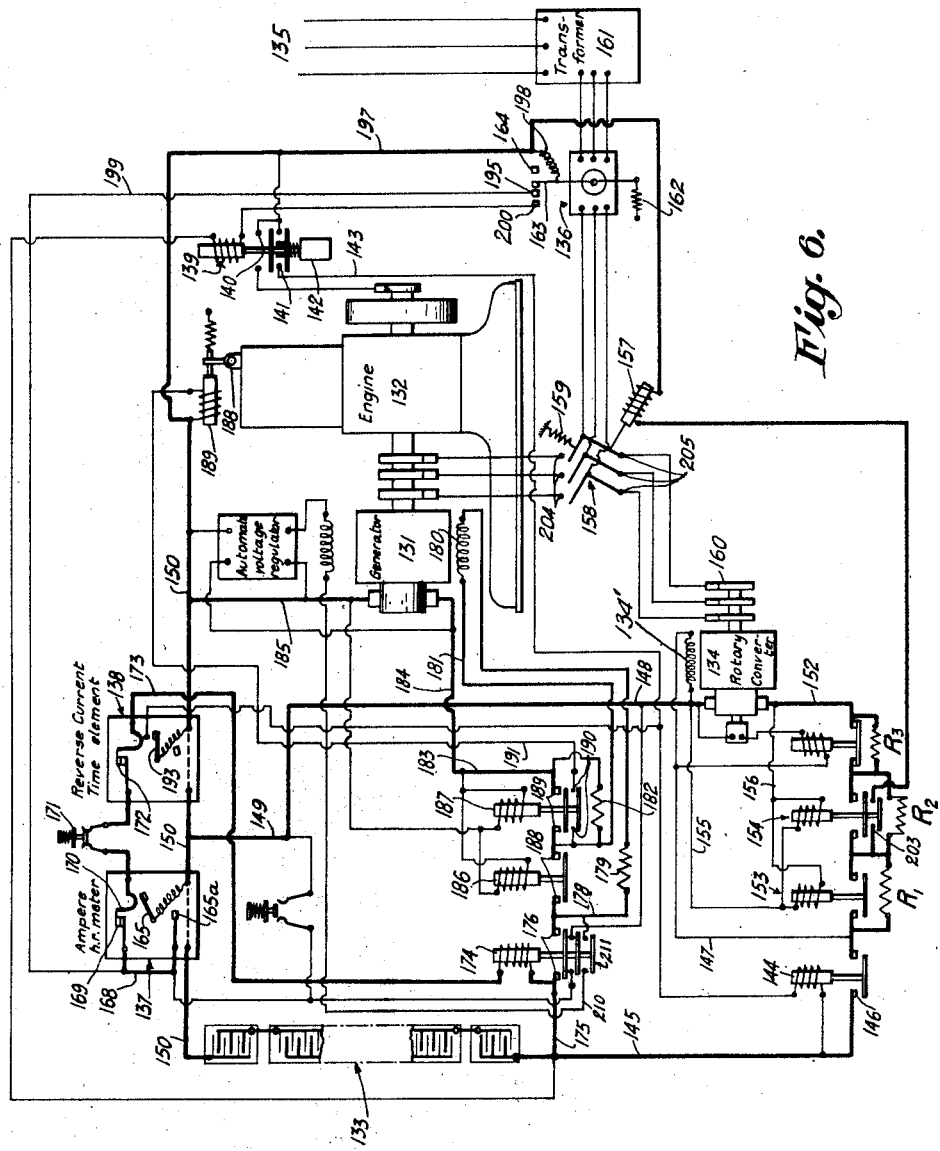

1,866,494

UNITED STATES PATENT OFFICE

CHESTER F. STRONG, OF MIAMI, FLORIDA

POWER GENERATING SYSTEM

Application filed March 26, 1930. Serial No. 438,923.

This invention relates generally to prime mover operated electrical generating equipment and more particularly to the automatic control of a series of alternating current generating units operated preferably by prime movers of the internal combustion engine type such as Diesel or gasoline engines.

Electrical generating equipment adapted to supply current for the various requirements of hotels, office buildings, apartment houses etc. must be able to meet effectively sudden changes in demands which might vary from no load to full load or vice versa in a very few seconds, this being caused by the use of elevators or equipment having similar starting and stopping characteristics. The load may also include devices such as lamps, motors that operate more or less continuously, or various other equipment in use in the building. If each building is provided with its own generating equipment, such as my invention is particularly adapted to permit, it is preferable to provide a plurality of units and operate the same only as is required to meet the demand. This effects a substantial saving in operating costs and maintenance but there is the difficulty of meeting either normal increases or relatively sudden increases in demand for current while a unit is being started to take care of this demand. This problem is further complicated when alternating current is being supplied because not only must the relatively slow starting prime movers such as Diesel engines be brought into action, but also the generating and control equipment must be adapted to permit effective and quick synchronizing with the alternating current already being supplied.

It is an object of my invention to provide improved means whereby the above and other features may be accomplished either alone or in combination. A further object of my invention is to secure the automatic operation of one or more electric generating units operated by prime movers for supplying alternating current to various devices and to maintain such service in accordance with the varying demands for electrical energy. Another and more specific object is to provide improved means whereby alternating current units driven preferably by internal combustion may be effectively started and synchronized and that during this operation alternating current may be supplied by temporary means coordinated with the generating units.

Other objects and advantages which might be mentioned here will be readily seen from the following description of the accompanying drawings which illustrate certain specific embodiments of the invention or parts thereof and in which:

Fig. 1 is a combined mechanical and wiring diagram of my improved arrangement,

Fig. 2 is an enlarged transverse view of an engine fly wheel embodying torque controlled mechanism for effecting certain of the automatic operations, Fig. 3 is a section thereof taken on line 3—3 of Fig. 2, Fig. 4 is an enlarged diagrammatic end view of the load responsive means, Fig. 5 is a modification of the load responsive means, and Fig. 6 is a diagram of a modified arrangement.

In the accompanying drawings three electrical generating units are shown in Fig. 1 and designated as A, B and C. A dynamo electric machinery for converting direct current into alternating current or vice versa specifically shown in this modification as a motor-generator set D has an alternating current generator 1 of the conventional type with separately excited fields and a direct current motor 2 for driving said alternator. A battery booster set E has a direct current generator 3 whose armature circuit is in series with a battery while a direct current motor 4 drives the generator 3. An auxiliary or constantly available source of current supply is shown herein specifically as a storage battery H permanently connected to wires 4 and 5 and to a wire 6 through the booster set E. It will be observed from my disclosure herein that this constantly available source is not only in the nature of an auxiliary source but is a regular source as well, in that it supplies a certain load demand and in addition is adapted to supply a sufficient amount of current for starting the units. A device G is responsive to the amount of electrical energy passing through its circuits, such a device being an indicating type of watt meter or a current device responsive only to the amount of current passing through its circuits. This will be shown more in detail in Figures 4 and 5 which will be described in detail later. These devices will be referred to generally as a load responsive device or means. Various translating devices are generally indicated at F, the supply of electric energy for which passes through load or current responsive device G.

With no energy being used by translating devices F the load responsive device G will have its oscillating arm, carrying a contact 9, held against a stop 11 by a spring 10. Under such conditions generating units A, B and C are not operating and potential is supplied to translating devices by motor-generator set D, the alternator 1 being connected to a set of three wires 13 and thence to load responsive device G and translating devices F as by sets of wires 14 and 15. Any consumption of energy by devices F will cause oscillating arm 16 of device G to be moved so that contacts 9 and 12 are closed, thereby permitting current to flow from battery H, through booster generator 3, main line 6 and wire 17 to arm 16, thence through contacts 9 and 12 to wire 18, closed contacts 19 and 20, wire 21 to coil 22 of dashpot controlled circuit closing device 23, thence through wire 24 to conductor 25, main line 5 and back to battery H. Energizing of coil 22 causes device 23 to successively close its contacts 26, the dashpot 27 being adjusted to give the proper time interval between the successive closing of contacts and to give sufficient time for motor 41 and its connected alternator 44 to attain considerable speed. Closing of contacts 26, permits current to flow from main 6 through conductor 31, contacts 26, and coils 32 of contactors 36 closing them in succession to cause current to pass through successive resistances R and series field 40 thence to the armature of direct current machine 41 and thence to the other main 5. Contactor 36 permit current from main 4 to be used direct from the battery, as by wire 37, for the first stage of starting, thereby eliminating loss which would accrue if this current passed through booster generator 3. By the time the last contactor 36A (the last one on the right end of the group) is closed, machine 41 has attained considerable speed. By closure of this last contact conductors 42 and 43 are connected and full voltage from main 6 is impressed on the machine which is acting as a motor revolving both the rotor of alternating current generator 44 and engine 45, thereby bringing the engine and generator up to practically synchronous speed. During acceleration of the engine and generator, arm 46 of a control device 47, generally described later, engages the upper contact of resistance 48 thereby cutting out resistance in the circuit of shunt field 50. The circuit through shunt field 50 passes from conductor 4 or 42 through contactors 36 to wire 51, resistance 52, wire 53 to arm 46, upper contact of resistance 48, wire 54 to field 50 and thence to main 5. Resistance 52 is such that direct current machine 41 operates at practically synchronous speed as a shunt motor when the last contactor 36 has been closed. Closing of this last contactor causes closed contacts 55 to be opened thereby de-energizing the first three of contactor coils 32 and opening their corresponding contactors 36, this occurring just as contactor 36A is closed. This prevents a short on armature of booster generator 3. Closing of the last contactor causes contacts 57 to be closed thereby energizing the coil of dashpot controlled circuit closing device 60, the dashpot permitting a definite time interval before contacts 61 are closed which in turn controls energization of the solenoid coil for operating the circuit closing device 65.

Delayed action by device 60 is to permit alternating current generator 44 and engine 45 to be brought up to practically synchronous speed by direct current machine 41 acting as a motor before the alternator is thrown on the line. Alternating current machine 44 is provided with amortiseur windings 44' to permit the machine to be easily pulled into step with the line current. All other alternating current machines such as 1, 66 and 67 are also provided with amortiseur windings. Closing of contacts in the switch 65 places alternator 44 in parallel with alternating current mains 13 and the amortiseur windings readily pull the machines connected thereto into synchronism.

Closing of contacts 76 at the same time switch 65 is closed causes a coil 77 to be energized so as to actuate and open the fuel supply valve for the engine and also causes energization and closure of a compression relief device, diagrammatically illustrated at 79 in parallel with coil 77, so as to establish full compression on the engine thereby permitting it to carry the load imposed by generator 44 and also drive generator 41 for supply of direct current excitation and battery charging current. Closing of contacts 76 also supplies current for excitation to alternating current generator 44 through slip rings 80.

If for any reason engine 45 fails to operate properly, means are provided to disconnect generating unit A and its engine from service and substitute generating unit C in its place. This is accomplished by torque controlled mechanism and circuits. As seen in the large view of Figs. 2 and 3 the engine shaft 80 is rigidly coupled to a fly wheel 83. Generator shaft 84 is free to rotate slightly in reference to engine shaft 80 and carries an arm 86 rigidly fastened to shaft 84. When generator or generators are acting as motors to rotate their respective engines, arm 86 rests against stop 90 and when the engine is driving the generator, arm 86 will be against stop 91. This causes contact 87 carried by arm 86 to engage contact 88 or 89, depending upon whether the engine is driving the generator, or the generator is acting as a motor and driving its engine. If arm 86 is against stop 90, contact 87 engages contact 88 and closes a circuit through one of the slip rings 81 on the engine shaft to energize one of the series field of a small motor 92, the armature of which is connected by a large gear reduction to rotate an arm 93 slowly in the direction of a contact spring 94. After a predetermined period of time arm 93 would be moved to close contact 94 with a spring contact 95 and also open contacts 20 and 19. Opening of these latter contacts opens the circuit through wire 21 and deenergizes coil 22 to open starting switch 23 of unit A, which is thereby disconnected and stopped from further operation. However, closure of contacts 94 and 95 closes a circuit to energize starting switch coil 22$^c$ of unit C by way of wires 100, 18$^c$, 21$^c$ and wire 101 to main 5, thereby placing unit C on the line 13 instead of machine A. To restart unit A, arm 93 can be pushed back against a stop 96.

Under normal operation when an engine is driving its generator, contacts 87 and 89 are closed which causes current to pass through the other of the slip rings 81 to the reversing or other of the series fields 97 of motor control device 92.

A further predetermined increase of current or energy through the load responsive device G causes arm 16 to move the spring held contact 12 against a spring supported contact 99 thereby establishing a circuit from wire 6, through wires 17, 18$^b$ and 21$^b$ to energize solenoid 22$^b$ which then closes switch 26$^b$ to start and operate unit B in a manner similar to that for unit A. Likewise a still further increase of current or energy through device G causes arm 16 to move spring supported contacts 12 and 99 so as to make contact with spring contact 100, thereby starting unit C if it is not already operating due to being substituted for unit A or B unit C operates in similar manner to A except that the starting and operating controller 26$^c$ causes the direct current machine 102 to be operated directly from the battery at all times without battery current passing through booster set E. The solenoid coil 22$^c$ is energized upon closure of contact 100 by wires 105', 18$^c$, contact 20$^c$ and wire 21$^c$. Failure of unit C to operate properly causes control device 92$^c$ to operate in a similar manner to control device 92 of unit A except that contacts 94$^c$ and 95$^c$ on being closed, start generating unit B if it is not already operating. It is not believed necessary to describe in further detail the circuits for controlling each unit as they are all controlled similarly to unit A. The corresponding parts of each unit or its circuits would have the same reference number, if not already so given, but with the suffix letter b and c to denote respectively units B and C.

Booster set E operates in the following manner: The motor 4 is connected to mains 5 and 6 and is differentially wound so as to maintain practically constant speed at varying loads when driving generator booster 3. All battery current passing to main 6 passes through armature of generator 3 as stated previously. A series field 104 is so wound, that when current is passing from the battery to main 6, it tends to raise the voltage of armature 3 in such direction as to add to the battery voltage and therefore assists in maintaining constant potential across mains 5 and 6 when the battery is discharging. The series field 104 is further assisted by a shunt field 105 as described later. Booster 3 may either cause battery H to be charged, or it may boost the battery voltage when the battery discharges in order to assist generating units A, B or C in maintaining constant potential on mains 5 and 6 or 14, the booster will be always ready to assist in maintaining this constant voltage in case the units and battery are unable to do so.

A booster relay control is generally indicated at 106. This control per se constitutes the subject matter of my co-pending application filed March 8, 1930, Ser. No. 434,281. Its construction and operation will not therefore be described in detail. It will suffice to state that when the direct current machines of generating units A, B or C are operating, the relays effect energization of shunt field 111 of booster 3 with such a polarity and to such an extent that booster 3 causes battery H to charge. A slight drop of potential across mains 5 and 6 causes the relays to energize field 105. This field causes booster 3 to reverse its polarity as field 111 is now deenergized. The combined action of the series field 104 and shunt field 105 as controlled by the relay is such as to cause the booster generator to maintain a constant potential across mains 5 and 6 during wide variations of current output from battery H.

The control device 47 for resistance 48, which is in series with shunt field 50 of direct current generator 41, normally has its arm 46 in contact with the uppermost resistance contact, thereby impressing full voltage from mains 5 and 6 across shunt field 50. This control device 47 is similar in construction to the current responsive device shown more in detail in Fig. 5 or it may be an indicating watt meter.

When the electrical output of alternating current generator 44 of unit A reaches the approximate full torque capacity of engine 45, arm 46 begins to move downward over the contacts of resistance 48, the position being governed by action of a spring 116. This inserts resistance in series with shunt field 50 of generator 41 and causes this generator to act as a motor as its amature is being supplied with a practically constant potential from mains 5 and 6. The power of engine 45 is thus supplemented so that it is possible for alternator 44 to carry an overload beyond the capacity of engine 45.

As an example, assume machine D to be disconnected and not operating and that there is sufficient load at translating devices F to have closed contacts 9 and 12 of the load responsive device G so that generating unit A is operating. A heavy load such as an electric motor 117 may now be thrown on the line and require sufficient power such that both units A and B should be operating. In this event contact arm 16 of device G would close contact 99 and 12 whereupon generating unit B would be started. However generating unit B being at a standstill, an appreciable interval of time would be required for it to reach full operating speed and assist in carrying the load. To carry the necessary load during this interval, control device 47 causes direct current machine 41 of unit A to act as a motor on current supplied from the batteries as previously described, thus enabling alternating generator 44 to carry the excess load temporarily.

Alternating current machines A, B, C and 1 are assumed to have the usual voltage control means for maintaining steady voltage with fluctuations of output but for simplicity they have been omitted.

It is also evident that booster machine E might be omitted and machine D allowed to operate at all times. In this event all generating units would have control switching similar to that for machine C. If one machine, with a control similar to that for unit C, has been brought into operation by device G, then if a heavy load coming on the line, such as the motor 117, demands more current than can be supplied by the regular unit in operation, this excess demand is supplied from generator 1 of machine D. Direct current machine 2 has its shunt field 118 controlled by the solenoid actuated resistance arrangement 119 the coil of the solenoid being in parallel with the battery terminals. Increasing load on machine 2, now acting as a motor causes a drop in battery voltage, which decreases the pull of the solenoid coil of device 119 and causes a spring 120 to move the resistance arm across resistance contacts in such a manner that the reduction of field strength in shunt 118 causes machine 2 to maintain practically constant speed while driving alternating current generator 1.

When the battery booster set E is in use it is possible to connect translating devices J for use only with direct current to mains 5 and 6 and thus secure all advantages of direct current service and at the same time supply alternating current service to essentially alternating current devices F.

In the modification shown in Fig. 6 a direct current generator 131 is employed having taps brought out from its direct current windings for the purpose of obtaining alternating current as is well understood. This generator is thus adapted to be used as a direct current motor during starting and as a direct and alternating current generator when driven by the engine. However, if desired, the windings for the direct and alternating currents may be separate. The generator is driven preferably by a prime mover 132 which is preferably of the internal combustion engine type such as a Diesel engine. There is also provided an electric storage battery 133, a rotary converter 134 and main lines 135 leading from the assembly of electrically connected units to various translating devices. A load responsive device 136 responds to changes in the amount of energy supplied to lines 135. This device may be either a polyphase or single phase relay device responsive to current changes or it may be a device of the watt meter type and responsive to changes in amount of current supplied, but in any case the device is referred to broadly as a load responsive device. There is further provided an ampere hour meter 137 and a reverse current time element 138.

Under normal operating conditions a relay switch 139 has its contact bar closed across contacts 140 while a second contact bar closes contacts 141. A suitable spring disposed beneath a plunger in an oil dash pot 142 normally keeps the contact bars of relay switch 139 in the closed position just described, as by forcing the plunger and solenoid core up. Energization of the solenoid of switch 139 moves the contact bars downwardly slowly against the action of the dash pot and its spring. It will be noted that with contacts 141 closed current is transmitted through a wire 143 to energize a solenoid 144 in turn connected to a battery lead 145. Upon energization of solenoid 144 contacts 146 are closed whereupon the field 134' of the rotary converter 134 is energized by current from battery 133 as by wires 145, contacts 146, and wires 147, 148, 149 and 150 to the other side of the battery. At the same time current is supplied to the armature of the rotary converter through contacts 146, resistances $R_1$, $R_2$, $R_3$ and wire 152, back to the battery by wires 148, 149, 150, thereby causing operation of the rotary converter.

As the converter speed increases, the voltage builds up across its armature as is well understood and at predetermined values of the voltage the solenoids of switches 153 and 154 are successively energized by current supplied through wires 155 and 156. Closure of these switches successively cuts out resistance $R_1$ and $R_2$ thereby allowing normal operation of the converter. It will also be noted that closing of switch 154 causes its lower contact bar to close contacts thereby energizing solenoid 157 of two way switch 158 which is moved to and held in the position shown against the tension of a spring 159. All six blade elements of this switch move together when operated by solenoid 157 or spring 159.

With rotary converter 134 in operation, alternating current may feed from its slip rings 160, through switch 158, load responsive device 136 and thence to a transformer 161 to line 135. Thus direct current from the battery is used for supplying alternating current to the line. With very little demand for current, a spring 162 causes arm 163 to rest against a stop 164. In this event engine driven generator 131 is not operating. Hence the small demands for alternating current is supplied from the rotary converter 134 which is operated by current from battery 133 as previously described.

In regard to the automatic starting and stopping of the engine, ampere hour meter 137 and reverse current relay 138 act in the same manner with reference to the direct current side of generator 131 as in my co-pending application Ser. No. 358,907 filed April 29, 1929, and as also previously described herein in connection with the preferred embodiment of my system. Briefly this operation is as follows: As the battery discharges, hand 165 on ampere hour meter 137 travels toward contact 165a and upon making contact therewith current flows from the battery through wire 150, thence through the usual electrical mechanism and connections within the ampere hour meter, thence through hand 165, wire 168, contacts 169 normally held closed by spring arm 170, normally closed stop button 171, normally closed spring held contacts 172, wire 173, solenoid 174 and wire 175 back to the battery. Energization of solenoid 174 closes contacts 176 thereby supplying current to direct current generator 131 to drive it as a motor and hence cause cranking or rotation of the engine to start same. This current is supplied from the battery through wires 175, closed contacts 176, wire 178 with resistance 179 therein, series field 180, wire 181, resistance 182, wires 183, 184, through the armature of engine generator 131, thence through wires 185 and 150 to the battery. The engine and generator are thus rotated and as the speed of rotation increases voltage across the armature increases whereupon solenoids 186 and 187 are energized so as to successively close pairs of contacts 188 and 189. These coils are in parallel with each other and in turn are shunted across the armature, the coils also having different amounts of ampere turns. As contacts 188 and 189 are closed, resistances 179 and 182 are successively cut out so as to supply current to generator 131 directly from the battery across contacts 176, 188 and 189 to wire 183 and hence to the generator, it being noted that when contacts 189 close, series field 180 is cut out. The engine is thus brought up to full speed and at the same time compression relief valve 188 is closed against the tension of a suitable spring due to energization of solenoid 189 simultaneously upon closure of solenoid 187. Solenoid 189 is energized by provision of a second contact bar to close contacts 190 whereupon current is supplied from the battery through wire 191 to solenoid 189 and thence to main battery lead 150. Closure of compression relief valve effects starting of the engine whereupon generator 131 now delivers current to the battery to recharge the same. As the battery charges, hand 165 moves upwardly until, when fully charged, the hand engages spring 170 and separates contacts 169, thereby breaking the main control circuit and stopping the engine as by opening of the compression relief valve by its spring.

While the engine is being driven to start same, the hand 193 of reverse current relay travels upwardly and after a predetermined time interval it will have traveled sufficiently far to open contacts 172 and thus deenergize solenoid 174 to open contacts 176 which break the supply of battery current to the generator, thereby to stop the driving of the engine. This time interval is adjusted so as to give ample opportunity for the engine to start if it is in normal condition. However, if the engine starts before expiration of this time period the hand reverses its travel and hence will permit the engine to continue operating.

Assuming that the engine is at a standstill and a small line current is being supplied by the battery. Now if the line current demand increases beyond that desirable to be supplied by the battery then this increase of current will cause arm 163 of the load responsive device 136 to swing over and engage contact 195 causing solenoid 174 to be energized, as by current flowing from positive battery lead 150, wires 197, 198, contact 195 and wire 199 to solenoid circuit including contacts 169, 172, wire 173, etc., thereby closing contacts 176 and starting engine and generator 131 and 132 as previously described. Direct current is now generated by the direct current side of generator 131 and feeds to the battery 133 for charging purposes as previously described. At the same time direct current feeds from generator 131 to the direct current side of rotary 134 as by wires 185, 150, 149, 148, 152, and 156, solenoids 154 and 153, wire 155, field 134', wire 147, across contacts 146 to wire 145 (also from wire 152 across contacts of solenoids 154, 153 and 144 to wire 145), thence across contacts 176, 188 and 189 to the other side of generator 131 as by wires 183, 184. The current thus passing through rotary converter is delivered to switch 158 and to the main-line 135. A further increase in line load causes switch arm 163 of device 136, to press contacts 195 and 200 together thereby energizing the solenoid of normally closed switch 139. This causes contacts 140 to open as by being moved downwardly thereby electrically adjusting the governor on engine 2 for increased loads. Contacts 141 are subsequently opened when the approximate full travel of the dash pot has been reached, the structure and mode of operation of this feature being shown in patents of mine. Lower bar for contacts 141 is provided with a suitable collar and spring arrangement which holds contacts 141 closed until almost the full dash pot travel has been reached. Opening of contacts 141 de-energizes solenoid 144 to open rotary converter switch 146 which thus eliminates the current on the converter and thereby causes switches of solenoids 153 and 154 to open also. This causes lower contacts 203 to be opened thereby de-energizing solenoid 157 of switch 158. Spring 159 thereupon throws over switch 158, which is preferably of the snap throw type, so as to close contacts 204 thereby supplying alternating current from generator 1 to the main line 135. Simultaneously the rotary converter circuit through contacts 205 to the line is opened. The rotary converter is not operating when switch 158 is closed to the generator 204. Upon decrease of load on line 135, contact 200 is opened and solenoid 139 is de-energized. The spring in the dash pot again causes contacts 140 and 141 to be closed thus starting the rotary converter which upon reaching full speed, with closing of contacts of solenoid 154, solenoid 157 of switch 158 is again energized and contacts 204 are opened and contacts 205 closed so that energy supply for the main line may again be derived from the rotary converter. Generator 131 and the rotary converter are provided preferably with amortiseur windings, which in cooperation with the snap throw switch 158 provides effective automatic arrangement for any synchronizing which may be necessary.

It is evident that ampere hour meter 137 may be omitted if load responsive device 136 is adjusted to close contact 195 whenever any electrical load is thrown on the main line. By such an arrangement the engine and generator will always be started or operating to carry the load directly instead of being carried on the battery for any length of time such as when the ampere hour meter is used. While my system is shown with a three phase circuit on the alternating current portion of the apparatus, it is quite evident that either single phase or a multi phase circuit other than three phase can be used.

A necessary holding circuit including wires 210 and switch 211 maintains switch solenoid 174 energized even after hand 165 moves away from contact 105a during a battery charging operation. The engine thus continues to drive the generator to charge the battery until hand 165 has moved to its full charged position which is against contact arm 170, the contacts 169 thereupon being opened when engaged by the arm 170 thereby to stop the engine.

Fig. 5 shows a load responsive single phase device 212 which is equivalent to the three phase device G in Fig. 4.

While two modifications have been described and illustrated in detail it will of course be understood that other modifications are available and that various changes and rearrangement of parts may be made by those skilled in the art along with possible additional improvements and functions, which nevertheless would utilize the spirit and substance of my invention as set forth in the appended claims.

I claim:

1. An automatic alternating current generating system comprising, in combination, a plurality of units each having an alternating current generator driven by an internal combustion motor, a storage battery in said system, means whereby said units may be supplied with current from said battery during starting, and control means for effecting the starting action automatically in accordance with load demand.

2. An alternating current generating system comprising, in combination, a plurality of units each having an alternating current generator driven by an internal combustion motor, an auxiliary source of current supply, and means for starting said units in a predetermined order by current supplied from said source automatically in accordance with the load demand.

3. An alternating current generating system comprising, in combination, a plurality of units each having an alternating current generator driven by an internal combustion engine, an auxiliary supply of direct current, a rotary converter adapted to convert said direct current into alternating current during small loads, and means for automatically starting said units in a predetermined order and in accordance with the load demand.

4. An alternating current generating system comprising, in combination, a plurality of units each having an alternating current generator driven by an internal combustion engine, a direct current side to the system including a main line supplied by said generators, a storage battery, dynamo electric machinery operated by current supplied from said battery and adapted to deliver alternating current to said main line during small loads, means for automatically starting said units in a predetermined order and in accordance with the line load, and a battery booster for maintaining a predetermined voltage regulation on the direct current side of the system.

5. An alternating current generating system comprising, in combination, an alternating current generator driven by an internal combustion engine, means for automatically starting said engine in accordance with line load, a direct current side to the system including a battery, and means including a battery booster for maintaining a predetermined voltage regulation on the direct current side of the system.

6. An alternating current generating system comprising, in combination, a plurality of units each having an alternating current generator driven by a prime mover, a main system line supplied by said generators, a source of direct current associated with the system including a storage battery, an electrical machine to convert alternating current into direct current whereby the storage battery may be charged or to convert direct current from the storage battery into alternating current for supplying alternating current to the system line, and means for successively starting said units automatically in accordance with operating conditions.

7. The combination set forth in claim 6 characterized in that said automatic means has provision for being initiated, upon failure of a unit to start, to effect substitution of another unit.

8. The combination set forth in claim 6 characterized in that said automatic means has provision for being initiated in accordance with line load on the alternating current system.

9. The combination set forth in claim 6 further characterized in that a generator of the direct current type is driven by each prime mover, and means are provided for supplying each direct current and generator with current from said battery whereby each direct current generator may act as a motor to drive said engine during starting thereof.

10. An alternating current generating system comprising, in combination, a plurality of units each having an alternating current generator driven by an internal combustion motor, an auxiliary source of current supply, means for starting said units in a predetermined order by current supplied from said source automatically in accordance with the load demand, and means whereby upon failure of a unit another unit is automatically started as a substitute.

11. An alternating current generating system comprising, in combination, a plurality of units each having an alternating current generator driven by an internal combustion motor, an auxiliary source of current supply, and means for starting said units in a predetermined order by current supplied from said source automatically in accordance with the load demand, said automatic means having provision to successively stop the units automatically in accordance with successive reductions in the line load.

12. An automatic generating system comprising, in combination, a prime mover operated electrical generator unit, an auxiliary source of current supply, means for automatically starting said unit by current supplied to the generator from said source, a torque mechanism interposed between said prime mover and generator, and means controlled by said torque mechanism for controlling the actuation of said prime mover by its generator automatically in accordance with whether the prime mover is driving the generator or is being driven by the generator acting as a motor as during starting.

13. An automatic generating system comprising, in combination, alternating and direct current systems including a plurality of prime mover operated electrical generating units, means whereby said units are adapted to be started automatically in accordance with the load on either the direct or alternating current systems, and means for successively stopping said units automatically in accordance with decreases in the load.

14. The combination set forth in claim 13 further characterized in that said units include alternating current generators while the source of direct current includes exciters for said alternating current generators and a storage battery, and means whereby the battery is charged by utilizing current generated by at least one of said units during operation thereof.

15. An alternating current generating system comprising, in combination, a plurality of units each having an alternating current generator driven by an internal combustion motor and adapted for parallel operation in supplying current to a system line, means for successively starting said units automatically in accordance with increases in line load, means for connecting the units to the line and synchronizing them with the line automatically upon being successively started including means whereby the units are allowed to be brought substantially to synchronous speed before being connected with the line and means whereby with two or more units in operation the same may be successively stopped automatically in accordance with successive reductions in the line load.

16. An alternating current generating system comprising, in combination, a plurality of units each having an alternating current generator driven by an internal combustion motor, an auxiliary source of current supply, means for starting said units in a predetermined order by current supplied from said source automatically in accordance with the load demand, and means whereby in starting a unit its generator is automatically connected to the system before the engine is permitted to generate power.

17. An alternating current generating system comprising, in combination, a plurality of units each having an alternating current generator driven by an internal combustion motor of the Diesel type having fuel supply control means, an auxiliary source of current supply, means for starting said units in a predetermined order by current supplied from said source automatically in accordance with the load demand, and means whereby in starting a unit its generator is connected to the system and in synchronism therewith and thereafter the engine fuel supply is automatically controlled to start the engine.

18. An alternating current generating system comprising, in combination, a plurality of units each having an alternating current generator driven by an internal combustion motor of the Diesel type having fuel supply control means, an auxiliary source of current supply, means for starting said units in a predetermined order by current supplied from said source automatically in accordance with the load demand, and means whereby in starting a unit its engine is first brought to synchronous speed and then fuel is automatically admitted to the engine to start the same.

19. An alternating current generating system comprising, in combination, a plurality of units each having an alternating current generator driven by an internal combustion motor of the Diesel type having fuel supply control means, an auxiliary source of current supply, means for starting said units in a predetermined order by current supplied from said source automatically in accordance with the load demand, means whereby in starting a unit its engine is first brought to synchronous speed and then fuel is automatically admitted to the engine to start the same, and means for successively stopping the engines and disconnecting them from the system automatically upon occurrence of predetermined reduction in load demand.

20. An alternating current generating system comprising, in combination, a plurality of units each having an alternating current generator driven by an internal combustion motor of the Diesel type having fuel supply control means, an auxiliary source of current supply, means for starting said units in a predetermined order by current supplied from said source automatically in accordance with the load demand, and means whereby in starting a unit its engine is first brought to synchronous speed and with its generator connected to the system fuel is then automatically admitted to the engine to start the same.

21. An alternating current generating system comprising, in combination, a plurality of units each having an alternating current generator driven by an internal combustion motor of the Diesel type having compression relief mechanism, an auxiliary source of current supply, means for starting said units in a predetermined order by current supplied from said source automatically in accordance with the load demand, and means whereby in starting a unit its engine compression is initially relieved and thereafter said compression relief mechanism is controlled automatically to effect compression.

22. An alternating current generating system comprising, in combination, a plurality of units each having an alternating current generator driven by an internal combustion motor of the Diesel type having compression relief mechanism and fuel supply control, an auxiliary source of current supply, means for starting said units in a predetermined order by current supplied from said source automatically in accordance with the load demand, and means whereby in starting a unit its engine compression is initially relieved and its fuel supply closed until substantially synchronous speed is reached after which said compression relief mechanism and fuel supply are controlled automatically to start the engine.

23. An alternating current generating system comprising, in combination, a plurality of units each having an alteranting current generator driven by an internal combustion motor of the Diesel type having solenoid controlled fuel supply means, an auxiliary source of current supply, means for starting said units in a predetermined order by current supplied from said source automatically in accordance with the load demand, and switch mechanism adapted in starting of a unit to connect the generator thereof to the system when substantially synchronous speed is obtained and for automatically energizing said solenoid to supply fuel to the engine for causing the same to generate power.

24. An alternating current generating system comprising, in combination, a plurality of units each having an alternating current generator driven by an internal combustion motor, an auxiliary source of current supply, and means for starting said units in a predetermined order by current supplied from said source automatically in accordance with the load demand, each of said generators having an exciter to which said starting current is supplied to cause the exciters to act as motors to rotate the engines to start the same.

25. An alternating current generating system comprising, in combination, a plurality of units each having an alternating current generator driven by an internal combustion motor, an auxiliary source of current supply, means for starting said units in a predetermined order by current supplied from said source automatically in accordance with the load demand, each of said generators having an exciter provided with series and shunt fields to which said starting current is supplied to cause the exciters to act as motors to rotate the engines to start the same, and means for controlling the current for said fields automatically as the engine and generator speed increases during starting so that the series field initially brings the unit to a high rate of speed and thereafter the shunt field maintains the engine at substantially synchronous speed.

26. An alternating current generating system comprising, in combination, a plurality of units each having an alternating current generator driven by an internal combustion motor, an auxiliary source of current supply, means for starting said units in a predetermined order by current supplied from said source automatically in accordance with the load demand, each of said generators having an exciter to which said starting current is supplied to cause the exciters to act as motors to rotate the engines to start the same, and means for causing at least one of said exciters to act as a motor to assist its engine in driving the generator automatically when the engine generator unit has reached a predetermined capacity.

27. An alternating current generating system comprising, in combination, a plurality of units each having an alternating current generator driven by an internal combustion motor, an auxiliary source of current supply, means for starting said units in a predetermined order by current supplied from said source automatically in accordance with the load demand, each of said generators having an exciter to which said starting current is supplied to cause the exciters to act as motors to rotate the engines to start the same, and means for cutting in exciter resistance to cause at least one of said exciters to act as a motor to assist its engine in driving the generator automatically when the engine generator unit has reached a predetermined capacity.

28. An automatic alternating current generating system comprising, in combination, a plurality of units each having an alternating current generator driven by an internal combustion motor, a storage battery in said system, a battery booster, means whereby said units may be supplied with current from said battery during starting and control means for effecting the starting action automatically in accordance with load demand, the means for supplying the starting current from the battery having provision for bypassing supplied current around said booster.

29. An automatic alternating current generating system comprising, in combination, a plurality of units each having an alternating current generator driven by an internal combustion motor, a storage battery in said system, a battery booster, means whereby said units may be supplied with current directly from said battery during starting initially and thereafter have the full system voltage impressed on the units to complete the starting operation, and control means for effecting the starting action automatically in accordance with load demand.

30. An automatic alternating current generating system comprising, in combination, a plurality of units each having an alternating current generator driven by an internal combustion motor, a storage battery in said system, means whereby said units may be supplied with current from said battery during starting, control means for effecting the starting action automatically in accordance with load demand, dynamo electric machinery for converting direct current into alternating current, and means for varying the field strength thereof automatically in accordance with variations in load demand to thereby maintain constant speed or frequency on the system.

31. An automatic alternating current generating system comprising, in combination, a plurality of units each having an alternating current generator driven by an internal combustion motor, a storage battery in said system, means whereby said units may be supplied with current from said battery during starting, control means for effecting the starting action automatically in accordance with load demand, dynamo electric machinery in said system adapted to receive direct current from said battery for conversion into alternating current which is supplied to the system, said dynamo electric machinery having a field and a variable field resistance, and means whereby with an increase in load and drop of battery voltage said resistance is automatically varied to weaken the strength of said field and thereby maintain substantially constant speed of the dynamo electric machinery with constant frequency for the alternating current of the system.

CHESTER F. STRONG.